(12) United States Patent
Rabbani et al.

(10) Patent No.: US 11,250,345 B1
(45) Date of Patent: Feb. 15, 2022

(54) METHODS FOR IDENTIFYING TRANSACTIONS WITH USER LOCATION INFORMATION

(71) Applicant: INTUIT INC., Mountain View, CA (US)

(72) Inventors: Tarek Rabbani, Mountain View, CA (US); Kishore Nene, Mountain View, CA (US); Ruobing Lu, Mountain View, CA (US); Siddhartha Misra, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 911 days.

(21) Appl. No.: 16/003,480

(22) Filed: Jun. 8, 2018

(51) Int. Cl.
*G06N 20/00* (2019.01)
*G06N 7/00* (2006.01)
(Continued)

(52) U.S. Cl.
CPC ....... *G06N 20/00* (2019.01); *G06F 16/24578* (2019.01); *G06F 16/285* (2019.01); *G06N 7/005* (2013.01)

(58) Field of Classification Search
CPC ........ G06N 20/00; G06N 20/10; G06N 20/20; G06N 7/005; G06N 7/00; G06F 16/285; G06F 16/24578
See application file for complete search history.

(56) References Cited

U.S. PATENT DOCUMENTS

| | | | | |
|---|---|---|---|---|
| 9,542,710 B1 * | 1/2017 | Izrailevsky | ............ | G06Q 40/12 |
| 2010/0257006 A1 * | 10/2010 | Quadracci | ............. | G06Q 30/02 705/7.33 |

(Continued)

FOREIGN PATENT DOCUMENTS

WO  WO-2016109584 A1 *  7/2016  ............. G06Q 30/02

OTHER PUBLICATIONS

Gundlapalli et al. "Using Natural Language Processing on the Free Text of Clinical Documents to Screen for Evidence of Homelessness Among US Veterans", Nov. 16, 2013, https://www.ncbi.nlm.nih.gov/pmc/articles/PMC3900197/ (Year: 2013).*

(Continued)

*Primary Examiner* — Kamran Afshar
*Assistant Examiner* — Shoun J Abraham
(74) *Attorney, Agent, or Firm* — Patterson + Sheridan, LLP (57) ABSTRACT

Certain aspects of the present disclosure provide techniques for improving a user experience based on electronic records of transactions. Embodiments include training a classifier using training data comprising a set of historical transaction descriptions and a set of corresponding historical classifications that indicate whether or not each historical transaction description of the set of historical transaction descriptions is associated with a user location. Embodiments further include receiving a transaction record describing a transaction associated with a user. Embodiments further include using the classifier to determine a classification for the transaction. The classification indicates whether or not the transaction description is associated with a location of the user. Embodiments further include providing, based at least in part on the classification, a communication to the user that relates to the location of the user.

21 Claims, 5 Drawing Sheets

| TRANSACTION DESCRIPTION | HAS USER LOCATION? |
|---|---|
| OFFICESUPPLIES.COM OS COM/BI SEATTLE WA | NO |
| Elizabeth's Grill Dallas TX | YES |
| Payment Received – Thank You! | NO |

(51) Int. Cl.
*G06F 16/28* (2019.01)
*G06F 16/2457* (2019.01)

(56) References Cited

U.S. PATENT DOCUMENTS

2017/0083920 A1* 3/2017 Zoldi .................... G06N 20/00
2018/0330378 A1* 11/2018 Fredinburg ........ G06Q 20/4016
2021/0065186 A1* 3/2021 Kramme ............ G06Q 30/0185

OTHER PUBLICATIONS

Devi et al. "Fraud Detection in Credit Card Transactions by using Classification Algorithms", 2017, https://ieeexplore.ieee.org/document/8455091 (Year: 2017).*
Hortacsu et al. "The Geography of Trade in Online Transactions: Evidence from eBay and MercadoLibre", 2009 https://www.aeaweb.org/articles?id=10.1257/mic.1.1.53 (Year: 2009).*
Uysal et al. "Geography and acquirer returns"; 2008 https://www.sciencedirect.com/science/article/pii/S104295730800003X (Year: 2008).*
Mahmud et al. "Home Location Identification of Twitter Users", 2014 https://dl.acm.org/doi/abs/10.1145/2528548 (Year: 2014).*

* cited by examiner

FIG. 1

| TRANSACTION DESCRIPTION | HAS USER LOCATION? |
|---|---|
| OFFICESUPPLIES.COM OS COM/BI SEATTLE WA | NO |
| Elizabeth's Grill Dallas TX | YES |
| Payment Received – Thank You! | NO |

METHODS FOR IDENTIFYING TRANSACTIONS WITH USER LOCATION INFORMATION

INTRODUCTION

Aspects of the present disclosure relate to identifying transactions with user location information. In particular, embodiments described herein involve improving a user experience by classifying transactions based on whether or not they are associated with user location information.

BACKGROUND

Applications often provide users with various features based on electronic records of transactions associated with the users. For example, a financial services application may provide a user with various features related to financial management based on electronic records of the user's financial transactions retrieved from the user's bank and/or credit card accounts. Certain features may be based on location information associated with transaction records. For example, fraud prevention features may be based on a user location associated with a transaction.

It is often challenging or impossible to determine a user location based on an electronic record of a transaction. For example, a transaction record may not include any location-related information. Furthermore, not all location-related information associated with a transaction record is necessarily related to a user location. For example, an electronic record of a transaction between a user and an online retailer may include location information (e.g., the headquarters of the online retailer) that is unrelated to a location of the user. Accordingly, there is a need for improved techniques for providing users with features based on location information associated with transaction records.

BRIEF SUMMARY

Certain embodiments provide a method for improving a user experience based on electronic records of transactions. The method generally includes training a classifier using training data comprising a set of historical transaction descriptions and a set of corresponding historical classifications that indicate whether or not each historical transaction description of the set of historical transaction descriptions is associated with a user location; receiving a transaction record describing a transaction associated with a user; using the classifier to determine a classification for the transaction by: providing input to the classifier based on a transaction description from the electronic record; determining, by the classifier, the classification for the transaction by assigning probability scores to different classifications based on similarities between the transaction description and historical transaction descriptions of the set of historical transaction descriptions that are associated with the different classifications; and receiving the classification for the transaction as an output from the classifier, wherein the classification indicates whether or not the transaction description is associated with a location of the user; and providing, based at least in part on the classification, a communication to the user that relates to the location of the user.

Other embodiments provide a non-transitory computer-readable medium comprising instructions that, when executed by one or more processors, cause the one or more processors to perform a method for improving a user experience based on electronic records of transactions. The method generally includes training a classifier using training data comprising a set of historical transaction descriptions and a set of corresponding historical classifications that indicate whether or not each historical transaction description of the set of historical transaction descriptions is associated with a user location; receiving a transaction record describing a transaction associated with a user; using the classifier to determine a classification for the transaction by: providing input to the classifier based on a transaction description from the electronic record; determining, by the classifier, the classification for the transaction by assigning probability scores to different classifications based on similarities between the transaction description and historical transaction descriptions of the set of historical transaction descriptions that are associated with the different classifications; and receiving the classification for the transaction as an output from the classifier, wherein the classification indicates whether or not the transaction description is associated with a location of the user; and providing, based at least in part on the classification, a communication to the user that relates to the location of the user.

Other embodiments provide a system comprising one or more processors and a non-transitory computer-readable medium comprising instructions that, when executed by the one or more processors, cause the one or more processors to perform a method for improving a user experience based on electronic records of transactions. The method generally includes training a classifier using training data comprising a set of historical transaction descriptions and a set of corresponding historical classifications that indicate whether or not each historical transaction description of the set of historical transaction descriptions is associated with a user location; receiving a transaction record describing a transaction associated with a user; using the classifier to determine a classification for the transaction by: providing input to the classifier based on a transaction description from the electronic record; determining, by the classifier, the classification for the transaction by assigning probability scores to different classifications based on similarities between the transaction description and historical transaction descriptions of the set of historical transaction descriptions that are associated with the different classifications; and receiving the classification for the transaction as an output from the classifier, wherein the classification indicates whether or not the transaction description is associated with a location of the user; and providing, based at least in part on the classification, a communication to the user that relates to the location of the user.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for improving a user experience based on electronic records of transactions.

Electronic records of transactions, such as records of credit and debit card transactions in a user's online credit card or bank account, often include transaction descriptions that describe certain aspects of the transactions. For example, a purchase by a user at a retail store may be captured in an electronic record that includes the amount and date of the purchase as well as a transaction description such as "Quick Store Washington D.C.," which may indicate that the transaction took place at a store called "Quick Store" in Washington, D.C. An application, such as a financial services application, may analyze the transaction record to determine the user's location at the time of the purchase so that services may be provided to the user based on the user's location. For example, the application may determine whether to trigger a fraud prevention process based on the user location associated with the transaction. For example, if the user location for the transaction is in a city that is two thousand miles away from a city in which the user completed a transaction one hour earlier, this may indicate that the transaction is fraudulent. In another example, the application may target advertisements to the user based on the user location associated with the transaction.

Not all transaction records include explicit location information, however, and some transaction records include location information that is not related to the user location. For example, if "Quick Store" in the above example is an online retailer that is headquartered in Washington, D.C., then the transaction description "Quick Store Washington D.C." may have no relation to the user location. The user may, for example, have completed the transaction online from the user's home in San Diego, Calif. Further, an establishment may include the name of a location (e.g., a city, state, etc.) within its business or trade name even when the actual location of the establishment is much different, such as Houston's restaurant in Los Angeles, Calif., or LA Fitness Gym in Houston, Tex. As such, it would be inefficient and inaccurate to trigger a fraud prevention process based on the transaction record. Furthermore, it would not be helpful to provide the user with targeted advertisements based on locations that are not relevant to the user.

Embodiments of the present disclosure relate to improving a user experience by classifying transaction records according to whether or not the transaction records include user location information in order to avoid providing unnecessary and/or irrelevant communications to the user and improve the accuracy and relevance of services that are based on the user's location. Techniques described herein make use of machine learning models in order to train a classifier using historical data to determine whether or not a transaction description in a transaction record includes a user location. It is noted that transaction records generally do not include a user location explicitly, but may include a transaction or business location that indicates a user's potential location at the time of the transaction, such as if the user conducted the transaction at a location indicated in the transaction record. As such, language herein referring to a transaction record "having a user location" or "including a user location" generally refers to a transaction record indicating a location at which a user may have conducted a transaction.

For example, a training data set may include historical transaction descriptions, each of which may be associated with a historical classification indicating whether or not the transaction description has a user location. Historical classifications may have been entered by users, customer service agents, or the like. Once trained, the classifier is able to classify a transaction as either having a user location or not having a user location based on a transaction description associated with the transaction, such as in an electronic record of the transaction. As an example, the classifier may determine that the transaction described by "Quick Store Washington D.C." does not have a user location, thereby preventing an unnecessary fraud prevention process that would waste resources and potentially frustrate the user.

Techniques described herein constitute an improvement with respect to conventional industry practices (such as initiating fraud prevention or providing targeted advertisements based on any location information included in transaction descriptions regardless of whether or not the location information indicates a user location, or not providing any services based on location information in transaction descriptions), as they prevent unnecessary usage of resources and improve a user experience by providing more accurate and relevant communications to users based on electronic records of transactions. Training a classifier with historical data to classify a transaction as either having a user location or not having a user location based on a description of the transaction overcomes problems in alternative techniques, such as techniques that make use of location-related information in transaction descriptions regardless of whether the location-related information is actually related to a user location. By avoiding unnecessary usage of system resources related to providing services to a user based on transaction records that do not actually include a user location, and by preventing inaccurate communications to users (e.g., fraud prevention communications or targeted advertisements that are based on location information that is not related to the user location), embodiments of the present disclosure improve the functioning, reliability, and usability of systems.

Machine Learning Concepts

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

Example Computing Environment

Figure 1:
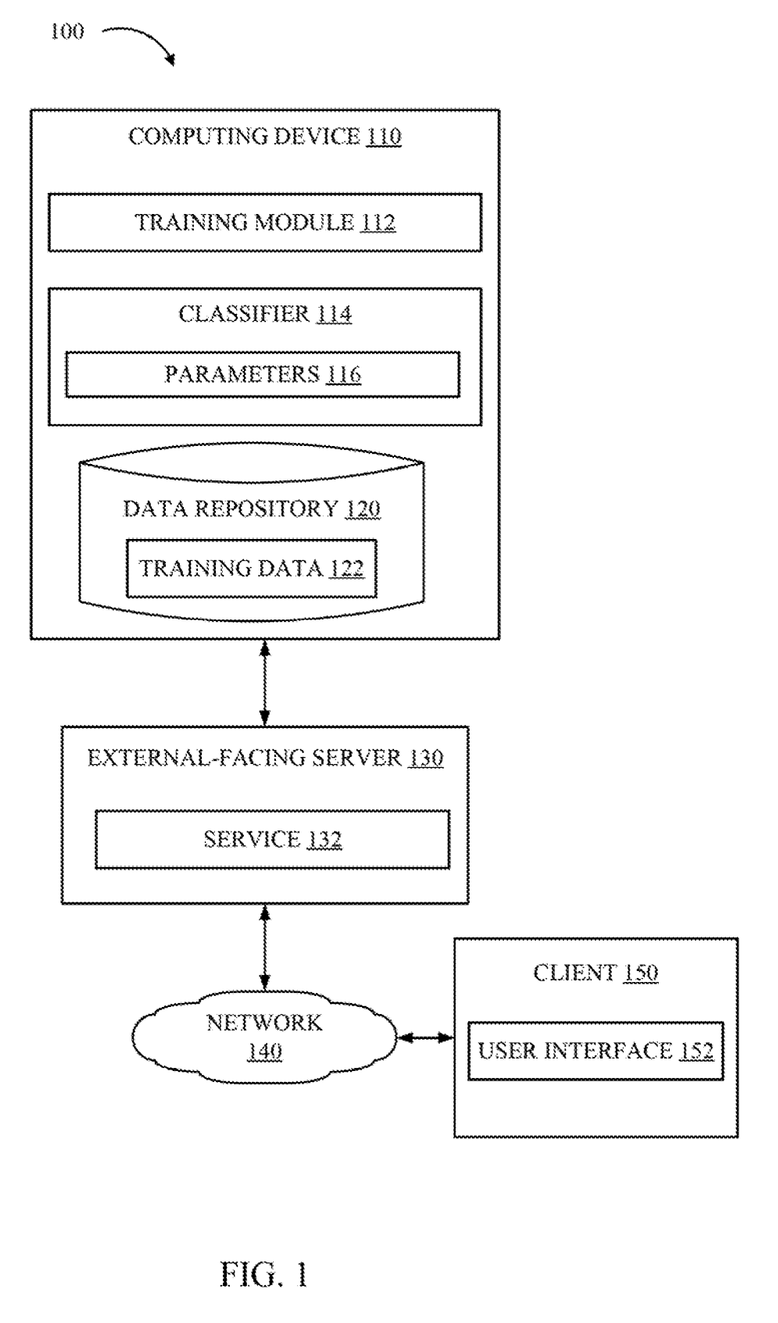
FIG. 1 depicts an example computing environment in which systems of the present disclosure may operate.

FIG. 1 illustrates an example computing environment 100 in which systems of the present disclosure may operate. As shown, the computing environment 100 includes a computing device 110 and a data repository 120. The computing environment 100 may also include an external-facing server 130. While computing device 110 and external-facing server 130 are illustrated as individual units, computing device 110 and external-facing server 130 may represent processors, memory, and other hardware in a single machine or distributed across multiple machines and locations (e.g., in a cloud computing arrangement) in other examples. Similarly, data repository 120 may represent memory, storage, and cache resources distributed across multiple machines and locations. Computing environment 100 also includes a client 150, which is connected to external-facing server 130 and computing device 110 via network 140. In one embodiment, network 140 may be the Internet.

Service 132 may be a web application or some other software service that employs predictive functionality of classifier 114 (e.g., to enhance the quality of experience (QoE) for consumers of the service 132, provide predictions or inferences, etc.). Classifier 114 may, for example, comprise a machine learning model. For example, service 132 may be a financial services application, and may use classifier 114 to predict classifications of financial transactions for financial management, tax preparation, fraud prevention, targeted advertising, and/or other purposes. In other examples, service 132 may use classifier 114 for some other type of task that involves making a prediction or an inference of an unknown quantity or characteristic based on a set of known attributes (e.g., features).

Service 132 may collect and send training data 122 to data repository 120, or training data 122 may be received from another source (e.g., training data 122 may be received, at least in part, from financial accounts of users, such as bank and credit card accounts). Training data 122 includes a collection of training instances. A training instance may comprise a set (e.g., a vector) of input features and a target value. In some embodiments, the target value is a label that classifier 114 is trained to predict based on the input features. Typically, the target value has been empirically verified for the training instance. For example, classifier 114 may be configured to classify a transaction according to whether or not a description of the transaction has a user location based on input features derived from the transaction description (e.g., groups of characters or text in the transaction description, such as words, phrases, groups of three characters, or the like).

Historical transaction descriptions may be retrieved from financial accounts of users, and historical classifications for the historical transaction descriptions may be empirically determined by receiving input from users or agents that review electronic records of transactions. The historical classification of a historical transaction description (e.g., "has a user location" or "has no user location"), as received from a user or agent, would be the label of a training instance that corresponds to the historical transaction description, while the input features of the training instance would be derived from features comprising one or more groups of characters from the text of the transaction description. In other words, a training instance may include a historical classification associated with a set of input features derived from a historical transaction description that corresponds to the historical classification. In some embodiments, the number of input features for each training instance can be at least three orders of magnitude smaller than the total number of training instances used to train the classifier 114. It is noted that the terms "features" and "input features" are not limiting, and embodiments of the present disclosure may be implemented using techniques that do not involve features or input features. Furthermore, certain machine learning techniques may involve limitations on numbers of input features, or may require a consistent number of input features for each training instance. As such the input features for a machine learning model in certain embodiments may be derived from the "features" determined from a transaction description, such that one input feature may comprise a plurality of features. Additionally, terms such as "parameter" and "variable" are in some instances interchangeable with the term "feature".

There are many different types of supervised machine-learning models that can be used for classifier 114. For example, classifier 114 may be a neural network, a support vector machine, a Bayesian belief network, a nearest-neighbor model (e.g., k-NN), a regression model, or a deep belief network, among others. Classifier 114 may also be an ensemble of several different individual machine-learning models. Such an ensemble may be homogenous (i.e., using multiple member models of the same type, such as a random forest of decision trees) or non-homogenous (i.e., using multiple member models of different types). Individual machine-learning models within such an ensemble may all be trained using the same subset of training data 122 or may be trained using overlapping or non-overlapping subsets randomly selected from training data 122.

Classifier 114 includes parameters 116 that are used to determine the output of classifier 114 for each training instance based on the input features of the training instance. For example, if classifier 114 is a neural network, the number of hidden layers, the number of nodes in each layer (e.g., a hidden layer or the output layer), and the existence of recurrence relationships between layers can vary.

Training data 122 is used by training module 112 to train classifier 114. For example, classifier 114 may be a random forest classifier, and training module 112 may build a "forest" of "trees" representing training data 122, where input features are randomly permuted at each split (e.g., each division of training data 122). In such embodiments, classifier 114 is "trained" by constructing a plurality of decision trees based on sub-divisions of training data 122 that include random permutations of input features associated with labels. It is noted that random forest techniques are only included as one example, and that other techniques may be employed for training classifier 114.

Once trained, classifier 114 is used by service 132 to classify transactions based on associated transaction descriptions, for example included in electronic records associated with the transactions. For example, service 132 may retrieve a transaction description related to a transaction from a financial account of a user, and may determine whether to initiate certain operations based on whether or not the transaction description has a user location. As such, service 132 may derive one or more input features from the transaction description by breaking the text of the transaction description into a series of character groups (e.g., groups of three characters). Service 132 may then provide the input features to classifier 114, which may return a label (e.g., a classification) for the transaction. For example, classifier 114 may classify the transaction description represented by the input features as either having a user location or not having a user location.

Service 132 may make various determinations based on the classification in order to improve a user experience for a user of service 132, such as a user that interacts with service 132 via user interface 152 of client 150. For example, service 132 may determine whether or not to initiate a fraud prevention process based on the classification. If the transaction is classified as "has user location," then service 132 may analyze the transaction description to determine the user location and compare the user location against various fraud prevention rules. For example, if the user location falls outside of a normal set of locations in which the user generally conducts transactions, service 132 may provide the user with a communication related to the transaction (e.g., via user interface 152, an email, a phone call, or the like), such as a request for confirmation that the user approved the transaction.

In another example, service 132 may determine whether to target location-based advertisements to a user based, at least in part, on the classification. If a transaction is classified as having no user location, then service 132 may determine that no location information included in an electronic record of the transaction should be used for targeting advertisements to the user. For example, the transaction description may have location information that is not related to the user location (e.g., the transaction description may include the location of the headquarters of an online retailer), and so should not be used to target advertisements to the user. If, however, the transaction is classified as having a user location, then service 132 may determine the user location from the transaction description and use the user location to target advertisements to the user (e.g., the user may be presented with advertisements via user interface 152 that are based on the user location, such as advertisements for businesses that are located at or near the user location).

Service 132 may alternatively provide the classification for the transaction and/or the user location for the transaction to another entity (e.g., a separate fraud prevention or advertisement service), and the other entity may take action based on the classification and/or user location.

Figure 2:
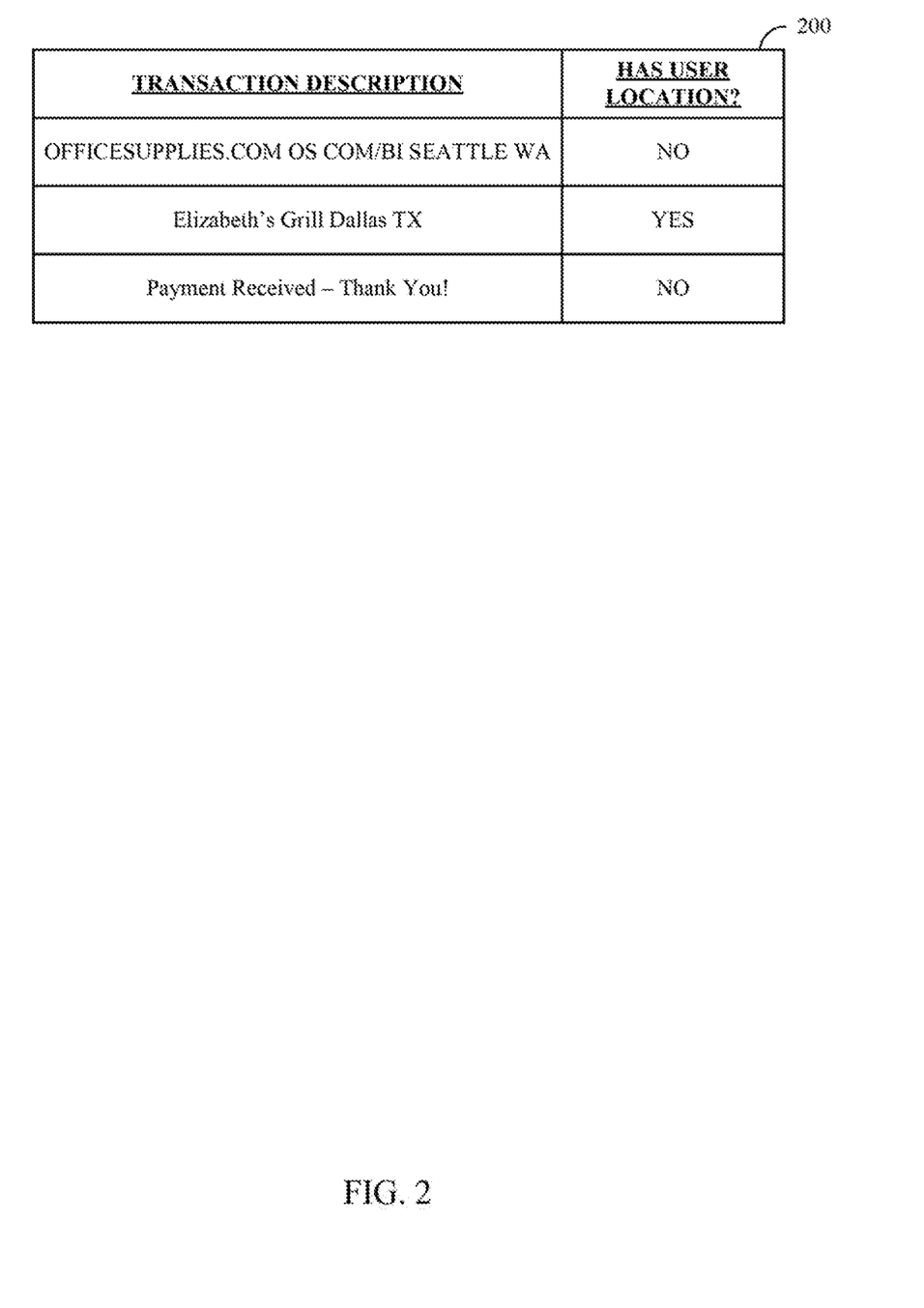
FIG. 2 depicts an example training data set for training a classifier as described herein.

FIG. 2 depicts an example training data set 200 for training a classifier. For example, training data set 200 may be included in training data 122, and may be used by training module 112 to train classifier 114, as depicted and described with respect to FIG. 1.

Training data set 200 comprises a set of historical transaction descriptions associated with historical classification data that indicates whether or not each historical transaction record has a user location. For example, the historical transaction descriptions may be from electronic records of transactions that were retrieved from one or more user accounts, such as bank accounts or credit card accounts. The historical classification data may have been provided by users or professionals, such as agents, that reviewed the transaction records.

One transaction description in training data set 200 comprises the text "OFFICESUPPLIES.COM OS COM/BI SEATTLE WA," and is classified as not having a user location. For example, the transaction description may relate to a transaction between the user and a business called OfficeSupplies.com, which in this example is an online retailer. As such, the location information "SEATTLE WA" that is included in the transaction description is not indicative of the user's location, but instead indicates the headquarters of the online retailer OfficeSupplies.com. It is noted that a user may conduct a transaction with OfficeSupplies.com while located in Seattle, Wash. In such a case, a user or agent may choose to classify the transaction as having a user location. As such, while not shown, there may be training instances that associate the transaction description "OFFICESUPPLIES.COM OS COM/BI SEATTLE WA" with a classification of "has user location".

Another transaction description in training data set 200 comprises the text "Elizabeth's Grill Dallas Tex.," and is classified as having a user location. For example, the transaction description in this example relates to a transaction between the user and a business called Elizabeth's Grill at a restaurant located in Dallas, Tex. As such, the location information "Dallas Tex." that is included in the transaction description is indicative of the user's location, as the user completed the transaction while physically located at the restaurant Elizabeth's Grill. It is noted that classifications in training data set 200 may be derived from input received from users or agents, and may reflect a judgment of these individuals as to whether a transaction description includes a user location. If a user conducts a transaction with "Elizabeth's Grill" from a remote location over the phone, the user or an agent may choose to classify the transaction description as not having a user location. In some cases, a classification included in training data set 200 may be inaccurate (e.g., if an agent did not know that a transaction was conducted remotely), but as the size of training data set 200 increases, incorrect classifications are likely to be outweighed by correct classifications, thereby improving the accuracy of classifications made based on training data set 200.

Another transaction description in training data set 200 comprises the text "Payment Received—Thank You!," and is classified as not having a user location. For example, the transaction description may relate to a transaction between the user and an unknown business that includes this generic description in records of all of its transactions that are provided to users' financial accounts. As such, the transaction description contains no location information at all, whether related to the user location or otherwise.

Training data set 200 may be stored as a data structure such as a table (e.g., in data repository 120 of FIG. 1), and may be used to train a classifier.

In some embodiments, each transaction description in training data set 200 is "featurized" (e.g., broken into one or more features). For example, the transaction descriptions may be broken into overlapping groups of characters (in some cases including spaces), each group being a feature. "Elizabeth's Grill Dallas Tex.," for example, may be broken into the following features (underlined and separated by semi-colons herein for demonstrative purposes):

Eli; liz; iza; zab; abe; bet; eth; th'; h's; 's; sG; Gr; Gri; ril; ill; ll; lD; Da; Dal; all; lla; las; as; sT; TX.

The set of features listed above are used as data within input features, and the classification "has user location" is used as a target value to train the classifier. Similar processes are performed for the other transaction descriptions and classifications in training data set 200.

It is noted that breaking transaction descriptions into overlapping three-character groups is merely included as one example, and alternative techniques may be used for generating features out of unstructured text. For example, a transaction description may be broken into any n-character groups, non-overlapping character groups, entire words (which requires tokenization, such as splitting based on spaces), and/or phrases. Breaking transaction descriptions into features generally provides better results than including the entire text of a transaction description as one feature, as it better accounts for typographical errors, variations in spelling and abbreviations, and variable elements of transaction descriptions such as dates. For example, the transaction descriptions "ABC Store May 11" and "ABC Store June 12" may not be associated with one another based only a comparison of the entire strings, but breaking the transaction descriptions into smaller groups of characters allows for the similarities to be more easily identified (e.g., if broken into features comprising three-character groups, these two descriptions would share all but one feature).

While training data set 200 is only shown with three transaction descriptions and associated classifications, actual training data sets may be much larger. Additionally, tables are only included as one example of a data structure for storing training data, and other types of data structures may be used, such as vectors, databases, arrays, hashes, etc.

Figure 3:
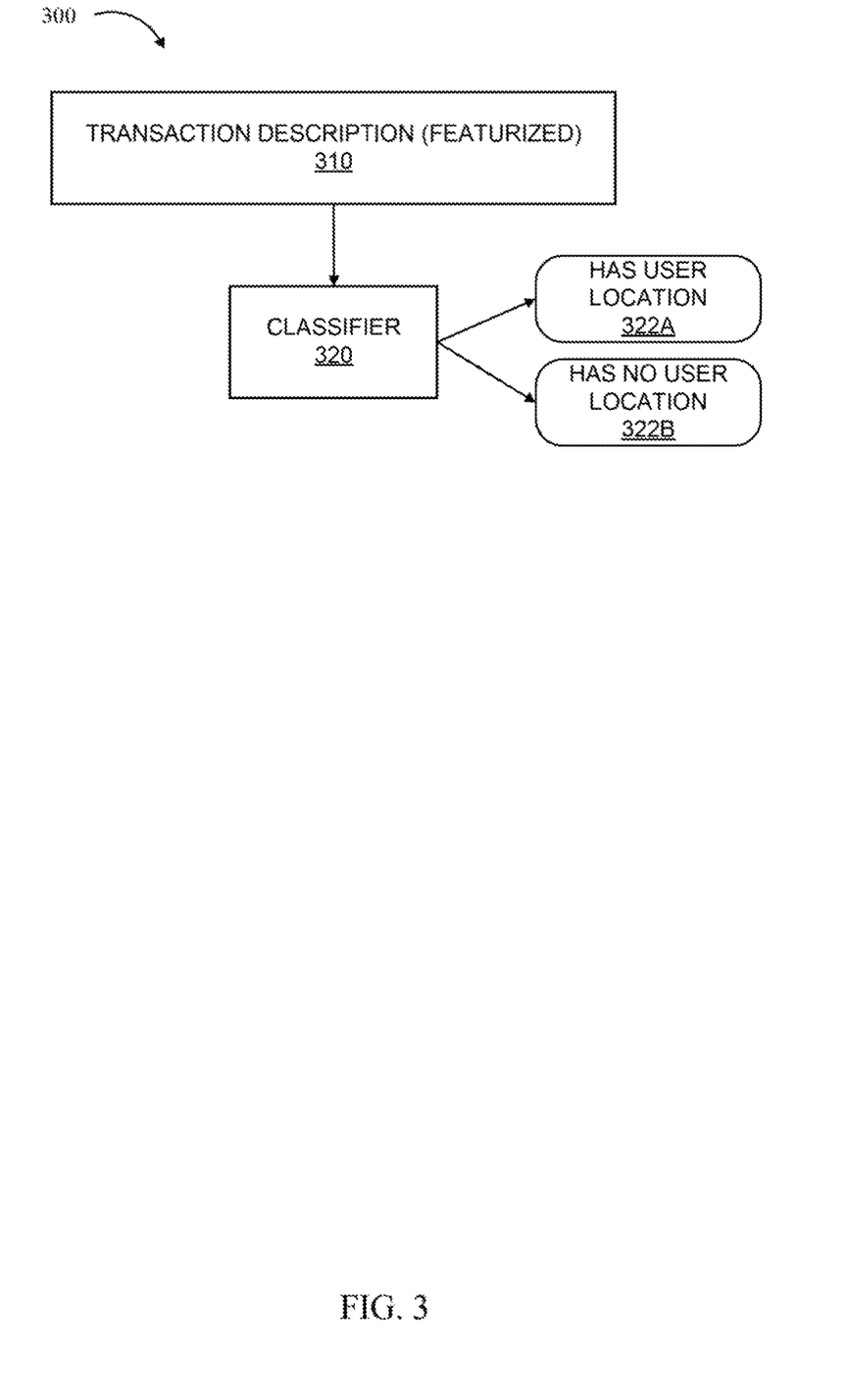
FIG. 3 depicts an example of using a classifier as described herein to classify a transaction as either having a user location or not having a user location based on a transaction description.

FIG. 3 depicts an example 300 of using a classifier 320 as described herein to classify a transaction as either having a user location at 322*a* or not having a user location at 322*b* based on a transaction description 310. For example, classifier 320 may be representative of classifier 114 of FIG. 1.

In example 300, the transaction description 310 is from an electronic record of a transaction, which has been retrieved from a user account, such as a bank or credit card account. For example, the user may provide account credentials for a user account to an application (e.g., service 132 of FIG. 1), and the application may retrieve one or more electronic records of transactions from the user account using the account credentials. Transaction description 310 has been retrieved from the electronic record of the transaction to be used as input to classifier 320.

In some embodiments, transaction description 310 may be featurized, or broken into one or more features, before it is provided as input to classifier 320. For example, transaction description 310 may comprise text, and the text may be broken into one or more groups of characters, such as groups of three characters. In one example, transaction description 310 includes the text "OFFICESUPPLIES SEATTLE," which may be broken into the following features (underlined and separated by semi-colons herein for demonstrative purposes):

OFF; FFI; FIC; ICE; CES; ESU; SUP; UPP; PPL; PLI; LIE; IES; ES; SS; SE; SEA; EAT; ATT; TTL; TLE.

The features of transaction description 310 are provided to classifier 320. Classifier 320 classifies transaction description 310 as either having a user location at 322*a* or not having a user location at 322B. For example, if transaction description 310 includes the text "OFFICESUPPLIES SEATTLE," it may be classified as not having a user location at 322*b* (e.g., based on machine learning algorithms that compare the features of transaction description 310 with features from training data, such as training data set 200 of FIG. 2, and determine that the features of transaction description 310 are historically associated with a classification of "has user location" in the training data to a sufficient degree).

In certain embodiments, classifier 320 assigns probability scores to different classifications based on degrees of association between the input features and classifications in the training data, and chooses a classification that has the highest probability score. In some embodiments, a classification is only chosen if it has a probability score above a threshold. If classifier 320 is a random forest classifier, a voting system is used to classify transaction description 310 such that each time an input feature of transaction description 310 matches an input feature associated with a classification in the training data (e.g., as represented by a forest of decision trees), a vote is collected for the classification.

A classification determined by classifier 320 may be used for a variety of purposes, such as determining whether to initiate a fraud prevention process or whether to target advertisements to the user based on location information included in transaction description 310. For example, if transaction description 310 includes the text "OFFICESUPPLIES SEATTLE" and is classified as not having a user location at 322*b*, then the location information "SEATTLE" may be disregarded, as it is not related to the location of the user. As such, the location information will not be used to perform actions such as initiating a fraud prevention process or targeting advertisements to the user. Alternatively, if transaction description 310 is classified as having a user location at 322A, the location information in transaction description 310 may be used to perform one or more actions, such as providing a communication to the user (e.g., related to fraud prevention or advertising).

Figure 4:
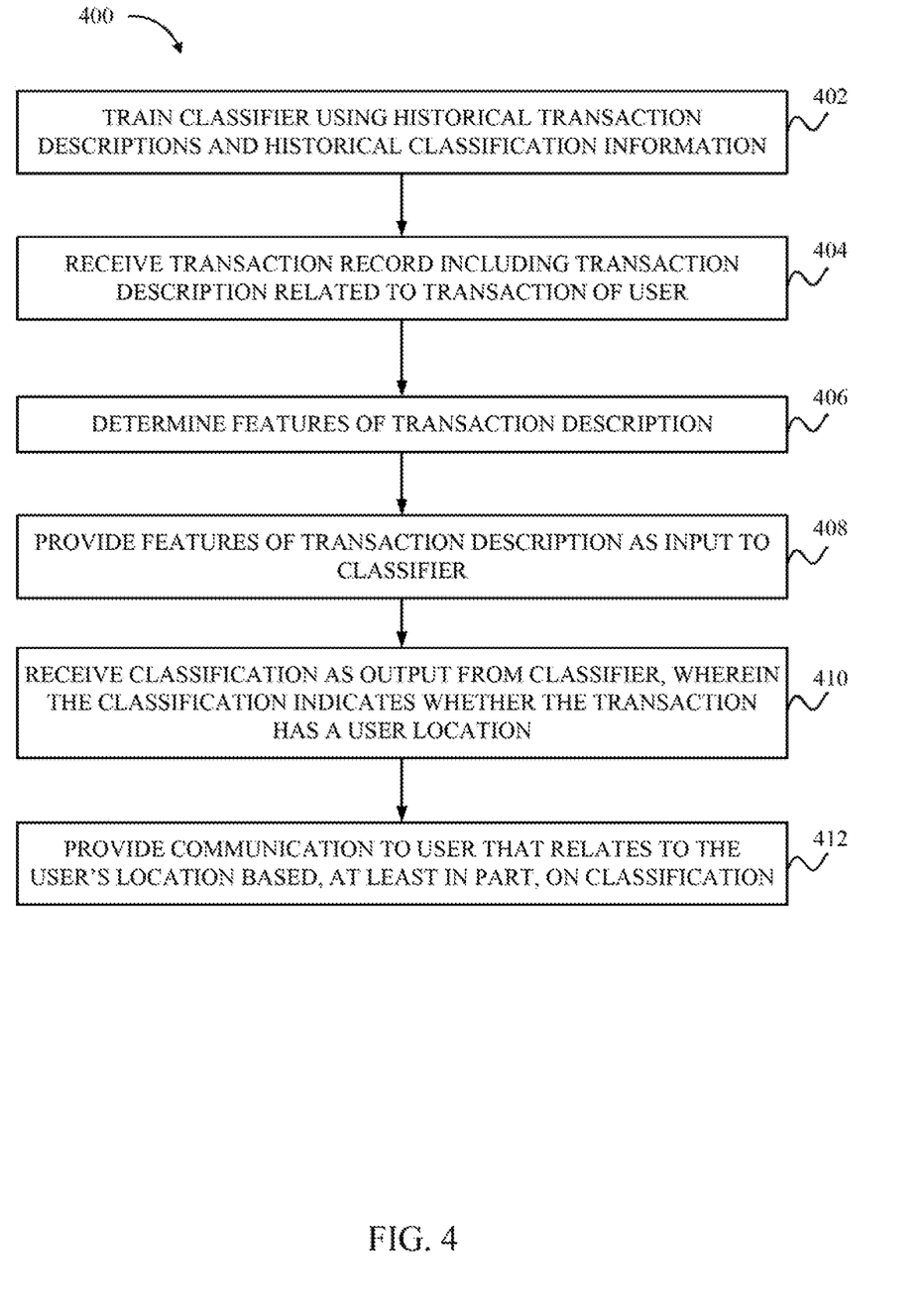
FIG. 4 depicts example operations for improving a user experience based on electronic records of transactions.

FIG. 4 depicts example operations 400 for improving a user experience based on electronic records of transactions.

At step 402, a classifier is trained using historical transaction descriptions and historical classification information. For example, the classifier may be classifier 114 of FIG. 1 and the historical transaction descriptions and historical classification information may be a training data set such as training data set 200 of FIG. 2. The historical transaction descriptions may comprise descriptions from electronic records of transactions that were retrieved from one or more user accounts and the historical classification information may, for example, have been provided by one or more users or agents. In some embodiments the historical transaction descriptions may each be broken into one or more features that are associated with the historical classification information as part of the training process.

At step 404, a transaction record is received that includes a transaction description related to a transaction of a user. For example, the transaction record may be retrieved from an account of the user, and may relate to a financial transaction of the user.

At step 406, features of the transaction description are determined. For example, the transaction description may be broken into one or more features, such as groups of characters.

At step 408, the features of the transaction description are provided as input to the classifier.

At step 410, a classification is received as an output from the classifier, the classification indicating whether the transaction has a user location. For example, the classifier may assign probability scores to different classifications, and may choose the classification with the highest probability score.

At step 412, a communication relating to the user's location is provided to the user based, at least in part, on the classification. For example, the classification may be used to determine whether to initiate a fraud prevention process based on location information in the transaction description, and the communication may relate to fraud prevention (e.g., a communication that requests confirmation from the user that a transaction described by the transaction record was authorized by the user). In another example, the classification may be used to determine whether to target advertisements to the user based on location information in the transaction description, and the communication may include an advertisement related to the location information.

Figure 5:
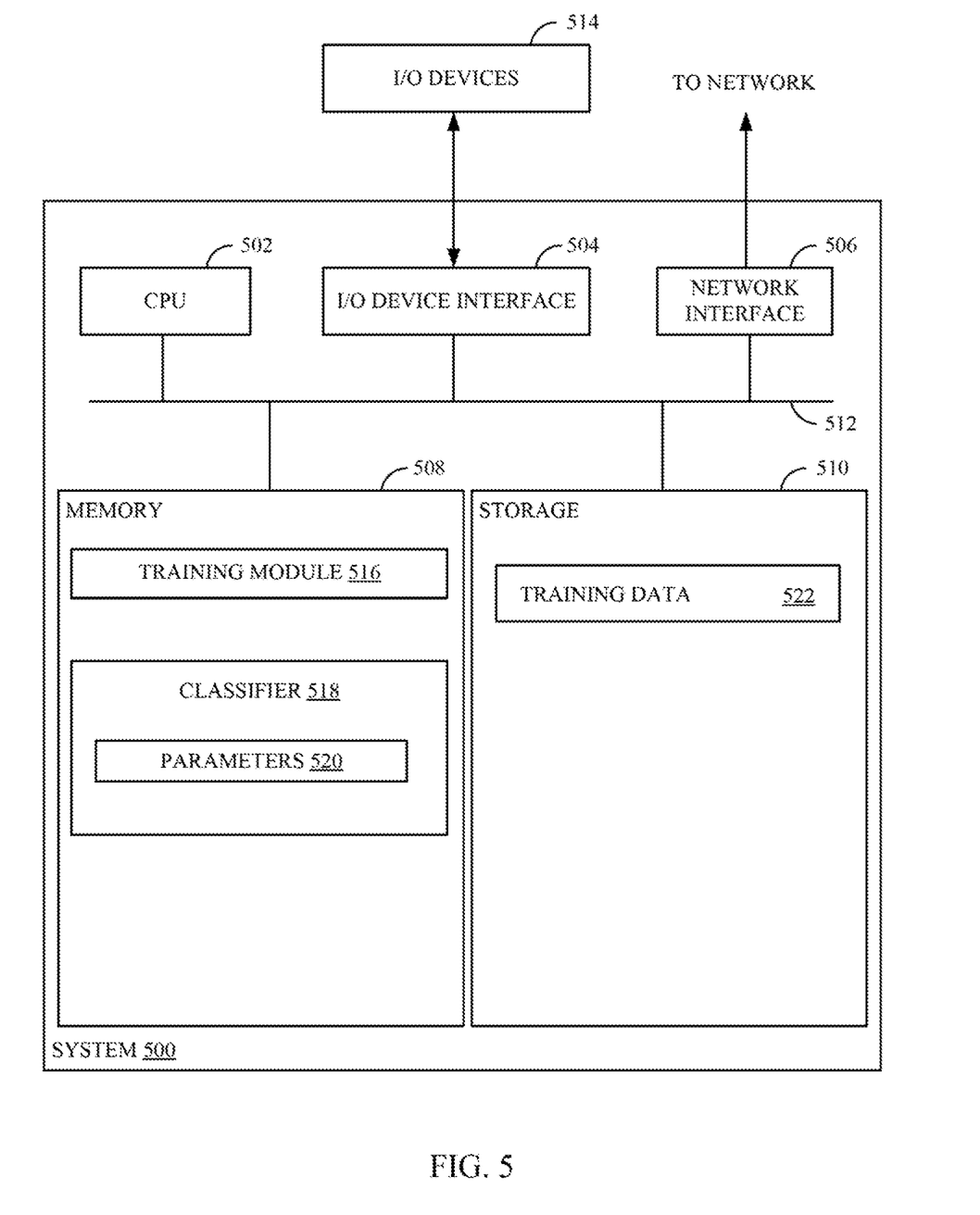
FIG. 5 depicts an example computer system with which embodiments of the present disclosure may be implemented.

FIG. 5 illustrates an example system 500 used for improving a user experience based on electronic records of transactions. For example, system 500 may be representative of computing device 110 in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises training data 522, which may comprise historical transaction descriptions, which may be broken into features (e.g., input features), and historical classification information (e.g., target values). For example, training data 522 may comprise training data set 200 of FIG. 2.

As shown, memory 508 includes a training module 516, which may perform operations related to training classifier 518, such as based on training data 522 (e.g., with respect to FIGS. 1-4).

Memory 508 also includes a classifier 518, which may be trained by training module 526 to classify transactions based on transaction descriptions according to techniques described herein (e.g., with respect to FIGS. 1-4). Classifier 518 comprises parameters 520 that are used to determine the output of the classifier 518 for each training instance in training data 522 based on the input features of the training instance.

In some embodiments, classifier 518 is used (e.g., by an application such as service 132 of FIG. 1) to classify a transaction based on a transaction description, which may be featurized (e.g., functionality described above with respect to FIGS. 1-4).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improving a user experience based on electronic records of transactions, comprising:
    training a machine learning model to output classifications of transaction records using a set of historical transaction descriptions and a set of corresponding historical classifications that indicate whether or not each historical transaction description of the set of historical transaction descriptions is associated with any user location at a time of a transaction;
    receiving a transaction record associated with a user comprising a transaction description;
    using the machine learning model to determine a transaction classification for the transaction record by:
        providing input to the machine learning model based on the transaction description from the transaction record;
        generating, by the machine learning model based on the input, a first probability score associated with a first classification indicating a first likelihood that a related transaction is associated with any user location at a time of the related transaction and a second probability score associated with a second classification indicating a second likelihood that the related transaction is not associated with any user location at the time of the related transaction, wherein the first probability score and the second probability score are determined based on similarities of the set of historical transaction descriptions to the transaction description;
        determining, by the machine learning model, the transaction classification based on a comparison of the first probability score and the second probability score, wherein the transaction classification indicates whether or not the related transaction is associated with any user location at the time of the related transaction; and receiving, from the machine learning model, the transaction classification for the related transaction; and determining whether or not to perform one or more operations based on the transaction classification to avoid unnecessary usage of system resources related to providing services to the user based on transaction records that are not associated with any user location at the time of the related transactions.

2. The method of claim 1, further comprising providing, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at the time of the related transaction, that the related transaction is potentially fraudulent;

wherein the communication is related to the related transaction being potentially fraudulent.

3. The method of claim 1, further comprising providing, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at the time of the related transaction, an advertisement to provide to the user.

4. The method of claim 1, wherein training the machine learning model further comprises:

extracting a plurality of features from the set of historical transaction descriptions; and using the plurality of features as training inputs and the set of corresponding historical classifications as training outputs to train the machine learning model.

5. The method of claim 3, wherein providing the input to the machine learning model based on the transaction description from the transaction record comprises:

extracting one or more features from the transaction description; and providing the one or more features as the input to the machine learning model.

6. The method of claim 1, wherein the set of corresponding historical classifications is based on input received from at least one of:

a customer support agent; or a user associated with a given corresponding historical classification of the set of corresponding historical classifications.

7. The method of claim 1, wherein the machine learning model comprises a random forest classifier.

8. A non-transitory computer-readable medium comprising instructions that, when executed by one or more processors, cause the one or more processors to perform a method for improving a user experience based on electronic records of transactions, the method comprising:

training a machine learning model to output classifications of transaction records using a set of historical transaction descriptions and a set of corresponding historical classifications that indicate whether or not each historical transaction description of the set of historical transaction descriptions is associated with any user location at a time of a transaction;

receiving a transaction record associated with a user comprising a transaction description;

using the machine learning model to determine a transaction classification for the transaction record by:

providing input to the machine learning model based on the transaction description from the transaction record;

generating, by the machine learning model based on the input, a first probability score associated with a first classification indicating a first likelihood that a related transaction is associated with any user location at a time of the related transaction and a second probability score associated with a second classification indicating a second likelihood that the related transaction is not associated with any user location at the time of the related transaction, wherein the first probability score and the second probability score are determined based on similarities of the set of historical transaction descriptions to the transaction description; determining, by the machine learning model, the transaction classification based on a comparison of the first probability score and the second probability score, wherein the transaction classification indicates whether or not the related transaction is associated with any user location at the time of the related transaction; and receiving, from the machine learning model, the transaction classification for the related transaction; and determining whether or not to perform one or more operations based on the transaction classification to avoid unnecessary usage of system resources related to providing services to the user based on transaction records that are not associated with any user location at the time of the related transactions.

9. The non-transitory computer-readable medium of claim 8, the method further comprising providing, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at the time of the related transaction, that the related transaction is potentially fraudulent;

wherein the communication is related to the related transaction being potentially fraudulent.

10. The non-transitory computer-readable medium of claim 8, the method further comprising providing, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at the time of the related transaction, an advertisement to provide to the user.

11. The non-transitory computer-readable medium of claim 8, wherein training the machine learning model further comprises:

extracting a plurality of features from the set of historical transaction descriptions; and using the plurality of features as training inputs and the set of corresponding historical classifications as training outputs to train the machine learning model.

12. The non-transitory computer-readable medium of claim 11, wherein providing the input to the machine learning model based on the transaction description from the transaction record comprises:

extracting one or more features from the transaction description; and providing the one or more features as the input to the machine learning model.

13. The non-transitory computer-readable medium of claim 8, wherein the set of corresponding historical classifications is based on input received from at least one of:

a customer support agent; or a user associated with a given corresponding historical classification of the set of corresponding historical classification.

14. The non-transitory computer-readable medium of claim 8, wherein the machine learning model comprises a random forest classifier.

15. A system, comprising one or more processors and a non-transitory computer-readable medium comprising instructions that, when executed by the one or more processors, cause the one or more processors to:

train a machine learning model to output classifications of transaction records using a set of historical transaction descriptions and a set of corresponding historical classifications that indicate whether or not each historical transaction description of the set of historical transaction descriptions is associated with any user location at a time of a transaction;

receive a transaction record associated with a user comprising a transaction description;

use the machine learning model to determine a transaction classification for the transaction record by:

providing input to the machine learning model based on the transaction description from the transaction record;

generating, by the machine learning model based on the input, a first probability score associated with a first classification indicating a first likelihood that a related transaction is associated with any user location at a time of the related transaction and a second probability score associated with a second classification indicating a second likelihood that the related transaction is not associated with any user location at the time of the related transaction, wherein the first probability score and the second probability score are determined based on similarities of the set of historical transaction descriptions to the transaction description; determining, by the machine learning model, the transaction classification based on a comparison of the first probability score and the second probability score, wherein the transaction classification indicates whether or not the related transaction is associated with any user location at the time of the related transaction; and receiving, from the machine learning model, the transaction classification for the related transaction; and determine whether or not to perform one or more operations based on the transaction classification to avoid unnecessary usage of system resources related to providing services to the user based on transaction records that are not associated with any user location at the time of the related transactions.

16. The system of claim 15, wherein the instructions further cause the one or more processors to provide, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at the time of the related transaction, that the related transaction is potentially fraudulent;

wherein the communication is related to the related transaction being potentially fraudulent.

17. The system of claim 15, wherein the instructions further cause the one or more processors to provide, based at least in part on the transaction classification, a communication to the user by:

determining that the transaction classification indicates that the transaction description is associated with a user location at the time of the related transaction;

determining the user location at the time of the related transaction based on the transaction description; and determining, based on the user location at time of the related transaction, an advertisement to provide to the user, wherein the communication comprises the advertisement.

18. The system of claim 15, wherein the instructions causing the one or more processors to train the machine learning model further comprises the instructions causing the one or more processors to:

extract a plurality of features from the set of historical transaction descriptions; and use the plurality of features as training inputs and the set of corresponding historical classifications as training outputs to train the machine learning model.

19. The system of claim 18, wherein the instructions causing the one or more processors to provide the input to the machine learning model based on the transaction description from the transaction record comprises the instructions causing the one or more processors to:

extract one or more features from the transaction description; and providing the one or more features as the input to the machine learning model.

20. The system of claim 15, wherein the set of corresponding historical classifications is based on input received from at least one of:

a customer support agent; or a user associated with a given corresponding historical classification of the set of corresponding historical classifications.

21. The system of claim 15, wherein the machine learning model comprises a random forest classifier.

* * * * *